Patented May 21, 1929.

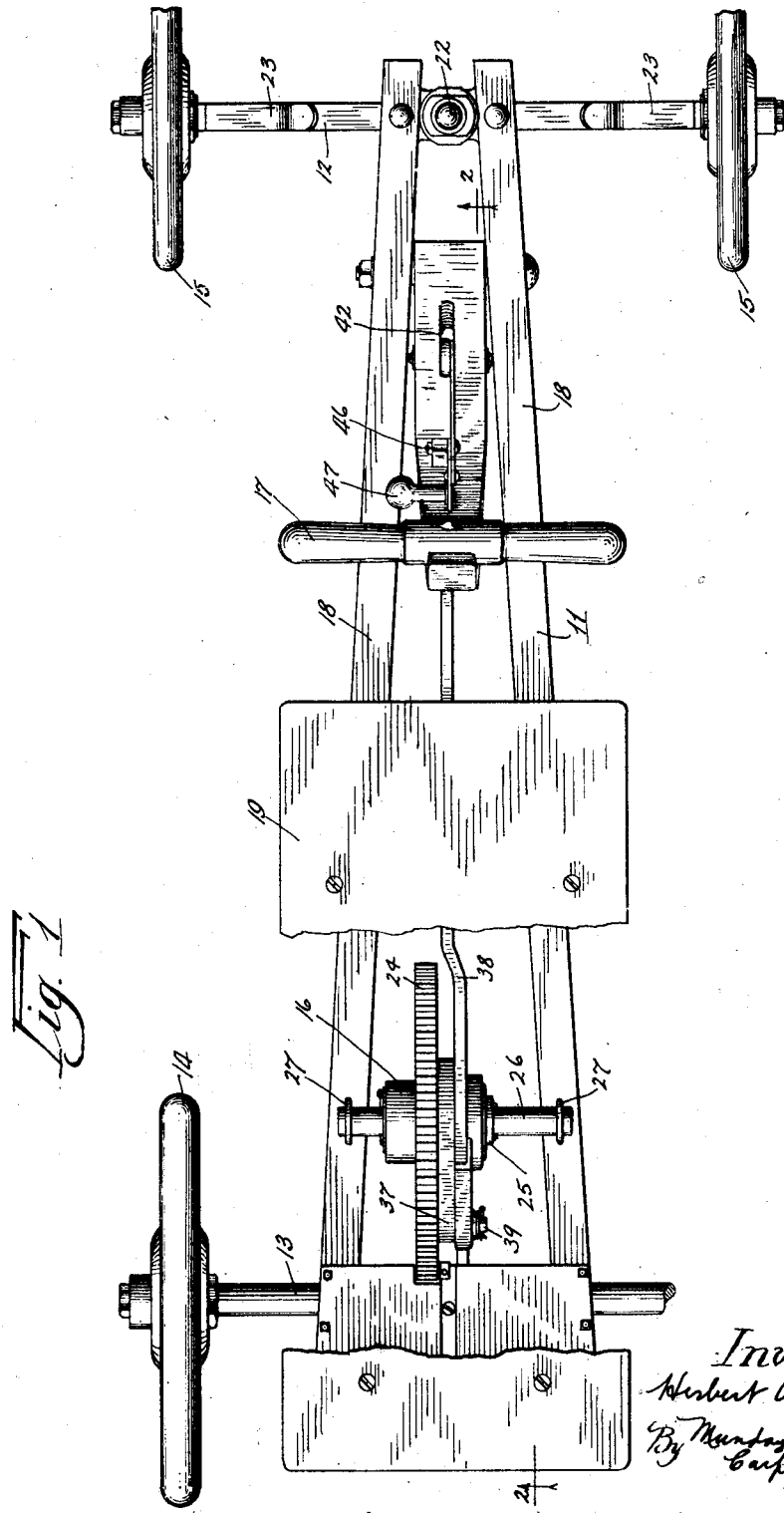

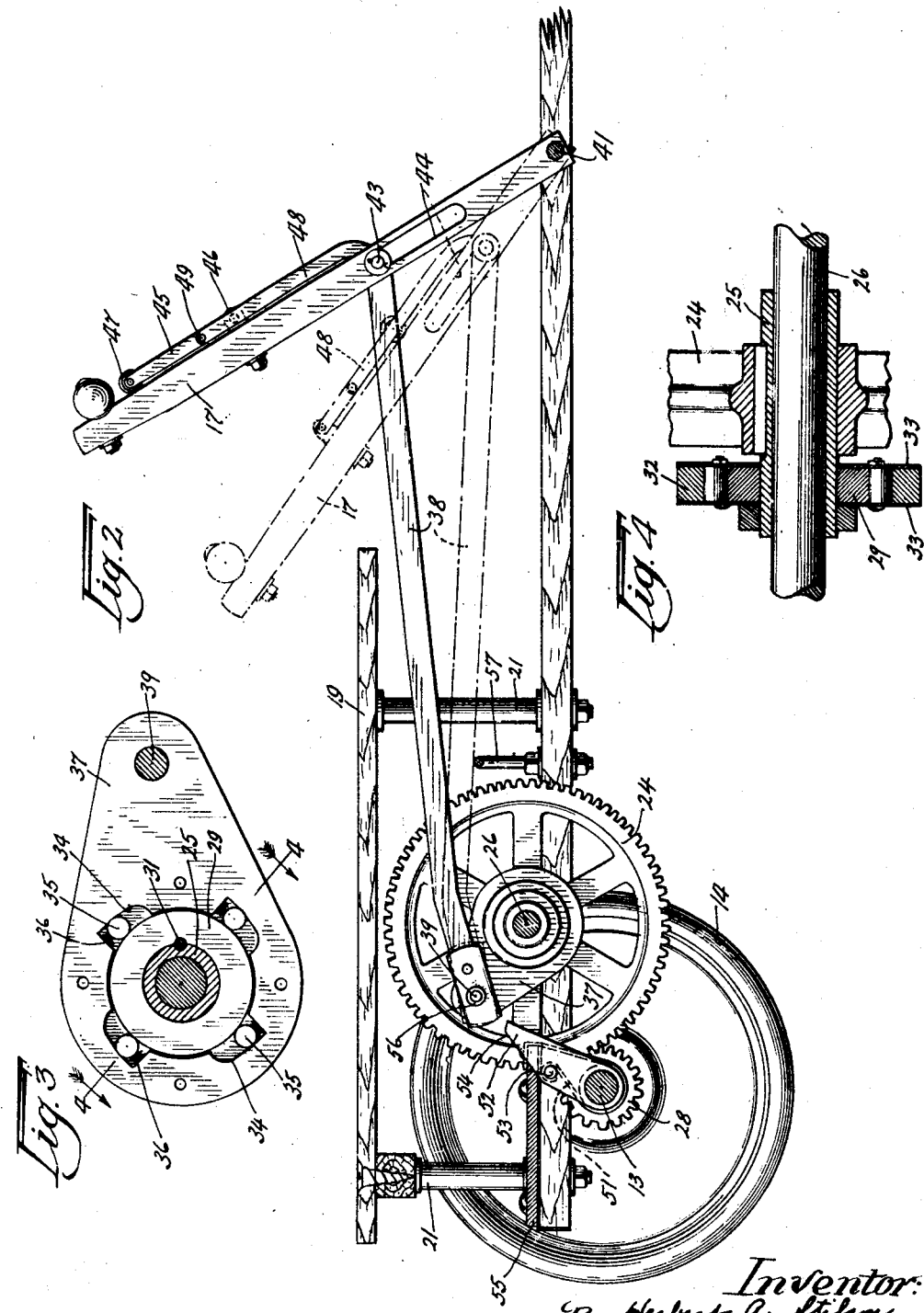

1,714,283

UNITED STATES PATENT OFFICE.

HERBERT A. STILSON, OF CHICAGO, ILLINOIS.

SELF-PROPELLED VEHICLE.

Application filed November 14, 1925, Serial No. 68,991. Renewed October 12, 1928.

This invention relates to a self-propelled vehicle and has for an object the provision of such a device, the speed of which may be varied to meet conditions, such as hill climbing or high speed travelling. In devices of this character provided heretofore, the transmission devices were fixed so that at all times and under all conditions, the ratio between the operating handle and the driving wheel was alike.

Another important object is to provide such a device that will permit the operating handle to remain stationary while coasting, so that the vehicle will not get out of control of the rider.

Another important object is to provide such a device having a means for breaking the speed thereof, either in case of emergency or while coasting, and this by the operation of the regular control handle.

Another important object is to provide such a device that will be light in weight, and that will require few and relatively simple parts to permit of production at a low price and on an efficiency basis.

Numerous other objects and advantages of the invention will be apparent from the following description, which taken in connection with the accompanying drawings discloses a preferred embodiment thereof.

Referring to the drawings:

Figure 1 is a plan view of a device embodying my invention and having parts thereof broken away to show certain details of construction;

Fig. 2 is a section taken substantially on line 2—2 of Figure 1;

Fig. 3 is an enlarged view showing certain details of construction, and

Fig. 4 is a section taken substantially on line 4—4 of Fig. 3.

To illustrate my invention, I have shown a skeleton frame or body 11, a front or guiding axle 12, a rear or driving axle 13, wheels 14 and 15, a transmission mechanism 16 and an operating handle 17. The body 11 may be of any suitable material and is preferably formed of members 18 suitably secured together at their forward and rear ends and providing a space therebetween. A seat platform 19 may be mounted on the frame members 18 in any suitable manner, and in the present instance I have shown a plurality of spacers 21 which may be secured to the seat by bolts, screws, or the like, and which may be of any suitable length so as to elevate and support the seat 19 a suitable distance from the frame members 18. The front axle 12 may be of any suitable shape in cross section and adapted to receive a pivot pin 22 by which it is pivotally attached to the frame 11. The axle 12 is also formed to provide a means for guiding and, in the present embodiment, I have shown space for foot rests 23 adjacent each end thereof. This axle is also formed to facilitate the attachment of a pair of wheels 15, which are rotatably secured thereto and may be of any suitable type. The rear, or drive, axle 13 may be rotatably mounted at the rear of the frame 11, in any suitable manner, and extends laterally from the frame to receive wheels at each end, either one of which may be fixed to the shaft to provide a driving wheel.

The transmission mechanism 16 may be of any suitable type that will give the proper ratio of speed between the operating handle 17 and the rear axle 13, and consequently the driving wheel. In the present instance, I have shown a preferred transmission mechanism including a transmission element or spur gear 24 of a relatively large diameter, which may be secured to a sleeve 25 mounted on a countershaft 26 that may be secured to the frame members 18 in any suitable manner, as at 27. The spur gear 24 is preferably mounted between the frame members 18 and in a position to engage a cooperating transmission element or pinion 28, which may be secured to the rear axle 13 in any suitable manner.

A ring 29, which is preferably of hardened steel, is secured to the sleeve 25 by a key 31 (Fig. 3), and a clutch device 32 is mounted over the ring 29 and retained in assembled position by a pair of retaining plates 33 secured thereto and embracing the opposite sides of the ring 29. Tapered slots 34 are provided in the clutch device 32, and rollers 35 are positioned in the slots 34 and are normally urged in a clockwise direction by spring 36 engaging a wall of the groove and the rollers 35. A portion of the clutch device 32 is extended to provide an operating arm 37, and a driving rod or link 38 is pivotally secured thereto by a pin 39. The operating handle may be of any suitable form or material and is pivotally secured between the frame members 18 by a bolt 41, extending therethrough and through the frame members 18. The operating handle may extend in either direction, that is, either upwardly or downwardly from the frame members 18 and be adapted for engagement by either the hands or feet of a rider, and in the present instance, I have shown the handle extending upwardly for engagement by the hands of a rider. While the link 38 may be connected to the handle in any suitable manner, I have shown the link extending into a slot 42 and secured to a pin 43 extending transversely through the handle 17 and mounted in a slot 44 extending transversely through the handle.

A speed changing device is provided, which may be arranged in any suitable manner so as to vary the ratio between the movement of the operating handle 17 and the driving wheel, that may be of any suitable form and construction, and in the present instance, I have shown such a device mounted on the operating handle 17 and including a lever 45, which may be pivoted to the handle by a bearing bolt 46 and provided with a knob 47 to facilitate the control thereof, and a link 48 pivoted to the lever 45 intermediate the ends thereof, as at 49, and connected to the pin 43 extending transversely through the handle 17 and to which the link 38 is connected.

A braking mechanism is provided that may be controlled by the transmission mechanism and operated during abnormal movement thereof. To accomplish this, I provide a friction device or band of friction material 51, which may be secured to the frame, at one end, in any suitable manner or position, and which is secured at its opposite end to a lever 52, as at 53. The lever 52 is preferably chamfered, as at 54, and a member 55 of the frame is similarly chamfered to provide an abutment for the lever 52 against which it is normally held by the band 51. The pin 39 is preferably provided with a roller 56 extending laterally from the link 38 and adapted for engaging the lever 52. A stop or brace 57 may be provided, which is secured to the frame members 18 in position to restrict the movement of the link 38.

In operation, power applied to the operating handle 17 in a rearward direction of movement is transmitted through the transmission devices or mechanism to the driving wheel and propels the vehicle. Movement in a forward direction is free and permits the rider to coast or to reset for another driving movement. This is accomplished through the rollers 35 in the slots 34. It will be noted (Fig. 3) that when the pin 39 is rotated in a counter-clockwise direction, the springs 36 normally urge the rollers in a clockwise direction, and the slots 34, being tapered in this direction, causes a binding of the rollers in the slots and against the ring 29, which is secured to the sleeve 31 to which the gear 24 is also secured. Movement of the pin 39 in a clockwise direction releases the rollers 35 and permits of the free movement of the gear 24. The pin 43 to which the link 38 is secured, being mounted in slots 34 and movable to different positions in the slot or toward and from the pivot bolt 41, to which the handle is secured, permits of varying the length of stroke of the link 38. The position of the pin 43 in the slot 44 is controlled by the change speed mechanism or lever 45. When the lever 45 is in the position shown in dotted lines, the pin 43 is at a lesser distance from the pivot 41 and permits a lesser movement to the gear 24. It may also be noted that at a greater distance, a lesser power is transmitted to the driving wheel and vice versa. The normal movement of the operating handle is confined in one direction by a stop 57 which engages the link 38 to prevent the point of connection of the link 38 with the clutch device 32 from coming into alignment with the countershaft 36 and the pin 43, so that force applied to the handle will not be applied directly upon the countershaft or lock the mechanism against movement. The handle is normally moved rearwardly to the position shown in dotted lines (Fig. 2) and if it is desired to apply a brake, the handle 17 is further or abnormally moved in a rearward direction, which causes the roller 56 to depress the lever 52 and tighten the friction member 51 about the shaft 13.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A propellable vehicle, comprising, a support, a driving axle thereon, an operating lever pivoted on said support, a power transmission mechanism connecting the lever and axle, including a second lever pivoted on said first lever and connected to a portion of said power transmission mechanism, and shiftable to alter the driving relation of the power transmission mechanism.

2. A propellable vehicle, comprising, a support, a driving axle thereon, an operating lever pivoted on said support, power transmission mechanism connecting the lever and axle, and including means capable of being shifted while the lever is being actuated for altering the driving relation between the lever and axle.

3. A propellable vehicle, comprising, a support, an axle thereon, a lever pivoted on said support, power transmission mechanism connecting the lever and axle, and a readily shiftable, control member adapted to be actuated to alter the driving relation of the power transmission mechanism.

4. A propellable vehicle, comprising, a support, an axle thereon, and a lever thereon, transmission mechanism between the axle and lever, including a shiftable member connected to said lever, and a control member pivotally connected to the lever and to the shiftable member for shifting the latter longitudinally of the lever for altering the driving relation of the transmission mechanism.

5. A device of the class described, the combination of a support, a driving axle thereon, a lever pivoted to said support and having a connecting member thereon capable of being shifted longitudinally of the lever, transmission devices connecting said connecting member and the axle, and a control member for shifting said connecting member to alter the driving relation of said transmission devices.

6. In a device of the class described, the combination of a support having a driving axle thereon, an actuating lever pivoted at one of its ends to said support, a second lever pivoted at its end to an intermediate part of the first lever, a rod having a driving connection with the axle, said rod having a slidable connection to an intermediate portion of the actuating lever and a link connecting the slidable connection to an intermediate portion of the second lever.

7. A device of the class described, the combination of a support, a driving axle thereon, a lever pivoted on said support, devices mounted on said lever and means connecting said devices and the axle for driving the axle on the actuation of said lever, and a shiftable control member for varying the point of connection of said devices to said lever.

8. A propellable vehicle, comprising, a support with a drive shaft thereon, a manually operable member on said support, power transmission connections from said member to said drive shaft, and braking means for said shaft controllable by said manually operated member.

9. A propellable vehicle, comprising, a support with a drive shaft thereon, a manually operable member on said support, power transmission connections from said member to said drive shaft, and braking means for said shaft actuated by a predetermined movement of said manually operated member.

10. A manually propellable vehicle, comprising, a frame supported on wheels, an elevated seat on said frame adjacent the rear thereof for seating a person, a lever pivoted to the forward portion of said frame in front of said seat and below the same, a gear on the axles of one of said wheels, another gear meshing therewith, a one way driving clutch connected to said latter gear for rotating the same, a link connected to said one way clutch for reciprocating said clutch, the opposite end of said link having a slot and pin connection with said first mentioned lever intermediate its length, a second lever pivotally mounted on said first lever, one end of said second lever having a connection with the slot and pin connection of said link, whereby to shift the same longitudinally of the first mentioned lever and a control handle for the opposite end of said second mentioned lever.

11. A child's vehicle, comprising, a relatively low support mounted on wheels, the rear portion of said support having a raised seat thereon, the forward portion of said support having a relatively long actuating lever pivoted thereto, a relatively small gear on the rearmost axle of said vehicle, a relatively large gear meshing with said first mentioned gear, an arm mounted on the shaft of said second mentioned gear, an over running clutch device adapted to connect said arm to the shaft of said second mentioned gear, a link pivoted to said arm, the opposite end of said link having a pivotal pin passing through an elongated slot in the first mentioned lever disposed intermediate the length of said lever, a control lever pivoted on said first mentioned lever and having one end connected to said pivotal pin at the end of said link, and a handle for said control lever and for said first mentioned lever.

12. A child's vehicle, comprising, a relatively low platform mounted on wheels, a relatively long lever pivoted at the front portion of said platform and adapted to project forwardly and in front of an operator seated on said platform, and a link connected to said lever intermediate its length, the opposite end of said link having a gear connected with the driving shaft of the vehicle and a control member within easy reach of the operator and connected to the pivotal connection of said link with said first mentioned lever for shifting said pivotal connection longitudinally of said lever, whereby to change the driving relation between said lever and the axle.

13. A child's vehicle, comprising, a relatively long and narrow platform mounted on wheels so as to be substantially close to the ground, a seat at the rear of said platform, a driving axle, a relatively long lever pivoted at one end on the platform and immediately in front of the seat, and devices pivotally connected to said lever intermediate its ends, said devices connecting with the driving axle to provide a power transmitting mechanism adapted to rotate said axle upon the reciprocation of said lever, and a control member adapted to be shifted by the operator when seated on the seat, for shifting the connection of said devices to said lever longitudinally of the lever, to alter the driving relation between said lever and said axle.

14. A propelled vehicle, comprising, a frame, a drive shaft rotatably mounted on said frame, a driving wheel on said shaft, power transmission means including an operating handle for driving said driving wheel, and a friction device for resisting rotation of said drive shaft controllable by said operating handle.

15. A propelled vehicle, comprising, a frame, a drive shaft rotatably mounted on said frame, a driving wheel on said shaft, power transmission means including an operating handle for driving said driving wheel, a friction device for resisting rotation of said drive shaft, and means for controlling said friction device, comprising, a link connected to said operating handle.

16. A propelled vehicle, comprising, a frame, a drive shaft rotatably mounted on said frame, a driving wheel on said shaft, power transmission means including an operating handle, a driving rod connected to said operating handle, and a friction brake device for resisting rotation of said drive shaft and adapted to be controlled by said driving rod.

17. A brake device for a child's vehicle, comprising, an arm pivoted on a driving element of the vehicle, a friction member secured to the frame of the vehicle and to said arm, said arm being formed to extend into the path of abnormal movement of control devices of said vehicle.

18. A child's vehicle, comprising, a relatively long and narrow platform mounted on wheels, so as to be substantially close to the ground, a seat at the rear of said platform, a driving axle, a relatively long lever pivoted at one end on the platform and immediately in front of the seat, and devices pivotally connected to said lever intermediate its ends, said devices connecting with the driving axle to provide a power transmitting mechanism adapted to rotate said axle upon the reciprocation of said lever, and a control member adapted to be shifted by the operator when seated on the seat, for shifting the connection of said devices to said lever longitudinally of the lever to alter the driving relation between said lever and said axle, and braking means for the rear axle adapted to be actuated on a predetermined shifting movement of said lever.

19. A propelled vehicle, comprising, a driving axle on said frame, wheels on said axle, a lever pivoted on said frame, driving connection from said lever to said axle, a brake for said axle including a shiftable arm, and means included in said driving connection from said lever to said axle for shifting said arm to operate the brake.

HERBERT A. STILSON.